(12) United States Patent
Ong et al.

(10) Patent No.: US 8,767,570 B2
(45) Date of Patent: Jul. 1, 2014

(54) INDICATING STATUS OF RADIO RESOURCES IN WIRELESS NETWORK

(75) Inventors: Eng Hwee Ong, Helsinki (FI); Jarkko Kneckt, Espoo (FI)

(73) Assignee: Nokia Corporation, Espoo (FI)

( * ) Notice: Subject to any disclaimer, the term of this patent is extended or adjusted under 35 U.S.C. 154(b) by 497 days.

(21) Appl. No.: 13/026,426

(22) Filed: Feb. 14, 2011

(65) Prior Publication Data

US 2012/0207036 A1 Aug. 16, 2012

(51) Int. Cl.
*H04J 1/16* (2006.01)
(52) U.S. Cl.
USPC ........................................................ 370/252
(58) Field of Classification Search
USPC ......... 370/252, 312, 234, 329, 230, 328, 351, 370/338, 390, 469, 229, 349, 232; 375/350, 375/346; 455/452; 709/229, 202
See application file for complete search history.

(56) References Cited

U.S. PATENT DOCUMENTS

| | | | |
|---|---|---|---|
| 5,682,601 A * | 10/1997 | Sasuta ........................... | 455/437 |
| 7,554,913 B2 * | 6/2009 | Gupta et al. .................. | 370/234 |
| 8,125,921 B2 * | 2/2012 | Frenger et al. ................ | 370/252 |
| 8,254,974 B2 * | 8/2012 | Chowdhary et al. .......... | 455/509 |

FOREIGN PATENT DOCUMENTS

| | | |
|---|---|---|
| WO | WO 2006/000955 A1 | 1/2006 |
| WO | WO 2009/125056 A1 | 10/2009 |
| WO | WO 2010/021902 A2 | 2/2010 |
| WO | WO 2010/024947 A1 | 3/2010 |

OTHER PUBLICATIONS

IEEE 802.11-10/1361r3, Jan. 18, 2011, Proposed TGac Draft Amendment, 154 pages.
"Non contiguous 40+40 MHz mode for Europe, Japan and global", Philippe Christin, IEEE 802.11-10/1274r3, Nov. 11, 2010, 9 pgs.

* cited by examiner

*Primary Examiner* — Chi Pham
*Assistant Examiner* — Alexander O Boakye
(74) *Attorney, Agent, or Firm* — Harrington & Smith

(57) ABSTRACT

Methods and apparatuses for indicating status of radio resources in a wireless network are provided. A requesting device transmits a resource request on a first radio channel to a responding device. The resource request includes a request to reserve the first radio channel between the requesting device and the responding device. The responding device transmits a resource response on the first radio channel in response to the resource request. The resource response comprises status information indicative of status of at least one second radio channel not requested to be reserved by the requesting device.

24 Claims, 8 Drawing Sheets

INDICATING STATUS OF RADIO RESOURCES IN WIRELESS NETWORK

FIELD

The invention relates to the field of wireless communications and, particularly, to indicating status of radio resources in a wireless communications system.

BACKGROUND

Substantial improvement has been achieved in data transmission capacities of wireless networks. For example, there have been many developments increasing the radio throughput of wireless local area networks (WLAN). Various techniques exist for wireless networks to differentiate between data flows having different quality of service (QoS). Some wireless communications technologies enable to selectively use one or more radio channels to vary data transmission rate.

BRIEF DESCRIPTION

Various aspects of examples of the invention are set out in the claims.

According to an aspect of the present invention, there is provided a method, comprising: transmitting, by a requesting device, at least one resource request to a responding device, the resource request being transmitted on a first radio channel; and receiving, by the requesting device, a resource response on the first radio channel from the responding device after the resource request; wherein the resource request comprises a request to reserve the first radio channel between the requesting device and the responding device; and the resource response comprises status information indicative of status of at least one second radio channel not requested to be reserved by the requesting device.

According to another aspect, there is provided an apparatus, comprising at least one processor; and at least one memory including a computer program code, wherein the at least one memory and the computer program code are configured, with the at least one processor, to cause the apparatus to: cause transmission of at least one resource request to a responding device, the resource request being transmitted on a first radio channel; and detect a resource response on the first radio channel from the responding device after the resource request; wherein the resource request comprises a request to reserve the first radio channel; and the resource response comprises status information indicative of status of at least one second radio channel not requested to be reserved by the apparatus.

Some embodiments of the invention are defined in the dependent claims.

The invention and various embodiments of the invention provide several advantages, which will become apparent from the detailed description below.

LIST OF DRAWINGS

Embodiments of the present invention are described below, by way of example only, with reference to the accompanying drawings, in which FIG. 1 illustrates an example of a wireless communication system to which embodiments of the invention may be applied;

FIGS. 2a and 2b illustrate wireless local area network channelization;

FIGS. 3a, 3b, and 3c illustrate methods according to some embodiments of the invention;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
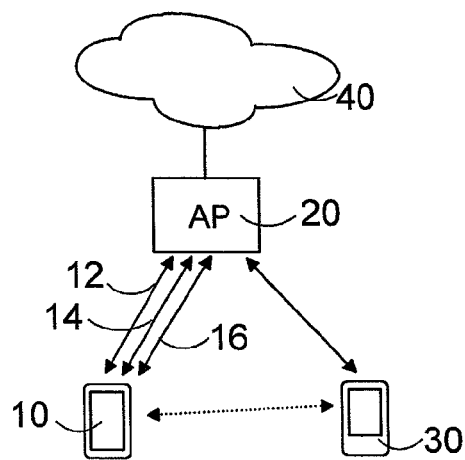

FIG. 1 illustrates an example of a wireless communication system including elements contending for network resources, such as elements supporting IEEE 802.11 features. While some embodiments of the invention are described with reference to IEEE 802.11 and, particularly, IEEE 802.11ac, it should be appreciated that other embodiments of the invention are applicable to networks based on other specifications, e.g. other versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks, which may be based on different specifications and/or standards. At least some of the present features may be applied to other current or future networks, in which the transmission between two entities may be carried on one or more secondary channels in addition to a primary channel.

Wireless devices 10, 30 may associate with an access point (AP) or base station. In some embodiments, the devices 10, 30 are IEEE 802.11 WLAN stations (STA). A basic service set (BSS) is a basic building block of an IEEE 802.11 wireless local area network (WLAN). The most common BSS type is an infrastructure BSS that includes a single AP together with all associated STAs. The AP 20 may be a fixed, or mobile AR The AP 20 may also provide access to other networks 40, e.g. the Internet. In another embodiment, at least one of the BSSs is an independent BSS (IBSS) or a mesh BSS (MBSS) without a dedicated AP, and in such embodiments the communication device 10 may be a non-access-point terminal station.

The wireless device 10 may be capable of communicating with another device, such as the AP 20, via zero or more secondary channels 14, 16 in addition to a primary channel 12 defined for the device 10. The 802.11n specifies a data transmission mode that includes 20 MHz wide primary and secondary channels. The primary channel is used in all data transmissions, and with clients supporting only the 20 MHz mode. A further definition in 802.11n is that the primary and secondary channels are adjacent. The 802.11n specification also defines a mode in which a STA can have only one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. In IEEE 802.11 based WLAN, a primary channel is a frequency channel in which a WLAN STA performs contention-based access to the wireless medium and in which it may obtain transmission opportunities. In some embodiments the device 10 is capable of operating under multi-channel features being developed by the IEEE 802.11ac task group, and apply at least some of the further transmission resource reservation related features illustrated below.

Figure 2A:
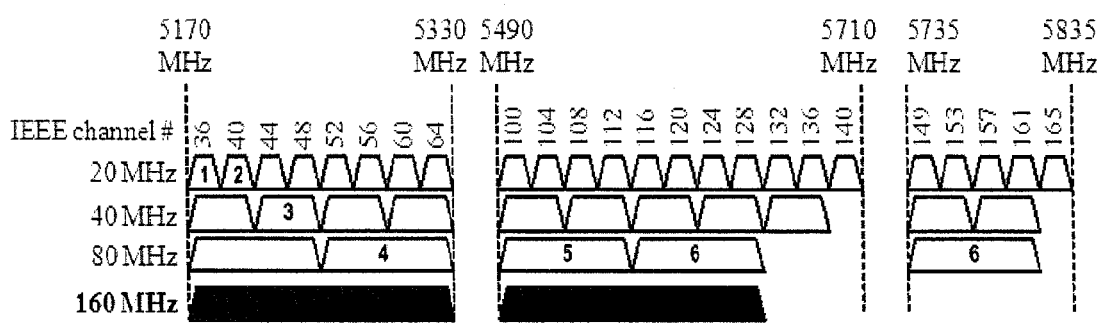

FIG. 2a illustrates an example channelization structure for 20 MHz, 40 MHz, 80 MHz, and 160 MHz channels for the US region. In this example, a 40 MHz transmission band is formed by two contiguous 20 MHz bands, and an 80 MHz transmission band is formed by two contiguous 40 MHz bands (numerals 1, 2, 3). However, a 160 MHz band may be formed by two contiguous (numerals 1 to 4) or non-contiguous 80 MHz bands (numerals 1 to 3 for a first 80 MHz band and any one of bands denoted by numerals 5 and 6 for a second 80 MHz band).

Thus, the transmission band of a BSS contains the primary channel and zero or more secondary channels. The secondary channels may be called a secondary channel, a tertiary channel, a quaternary channel, etc. The primary channel may be used for channel contention, and a transmission opportunity (TXOP) may be gained after successful contention on the primary channel. Every STA has a time duration (defined by a backoff factor), and if the STA detects that the primary channel has been free for the time duration, it gains the TXOP and starts transmission. If another STA gains the TXOP before that, the channel sensing is suspended, and the STA proceeds with the channel sensing after the TXOP of the other STA has ended.

A virtual carrier sensing function is provided by the provision of a network allocation vector (NAV) which is used to reserve a channel. Most of the transmitted frames comprise a duration field which can be used to reserve the medium (or provide NAV protection) for a fixed period of time. In practice, the NAV is a timer that indicates the amount of time the medium will be reserved. In a typical operation, the transmitting and receiving STAs will set the NAV to the time for which they expect to use the medium while other STAs count down from the NAV to zero before starting the channel contention. The virtual carrier sensing function indicates that the medium is busy when NAV is non-zero and idle when NAV is zero. The NAV setting may be available only on the primary channel of the BSS.

A TXOP holder (a wireless communications device 10, 20, 30 that has won the channel contention) may reserve channel(s) by issuing a resource request message, e.g. a Request-to-Send (RTS) message, to the receiver on every channel to be reserved. In one embodiment, the receiver may listen only to primary channel, and the RTS may cover information on other channels on which RTS is sent. The RTS frame may be transmitted to a non-primary channel only if the channel specific Clear Channel Assignment (CCA) indicates the channel to be idle. The RTS frame may request reservation of one or more channels. The receiver responds with a resource response message, e.g. a Clear-to-Send (CTS) message. The CTS frame may be transmitted to a channel that was requested by the RTS frame and which is detected to be idle on the basis of the channel specific CCA. Then, the TXOP holder may carry out the transmission on the free channels. The resource request and response messages may be used to set the NAV for the duration of the TXOP.

The currently envisaged 802.11ac RTS/CTS signaling supports a limited set of bandwidth configurations, i.e., 20, 40, 80, or 160 (80+80) MHz. The RTS and CTS frames may have a 2-bit bandwidth (BW) field to indicate the transmission bandwidth that is available and could be reserved. The CTS frame defines the channels that are reserved for RTS transmitter. Hence, there are altogether only 4 possible transmission bandwidth configurations that may be requested by the RTS frame, and for each requested bandwidth sizes the CTS frame contains four 4 possible transmission bandwidth reservations.

Channel Status Information Provision

According to some embodiments of the invention, a resource request receiver receiving a resource request from a TXOP holder is arranged to provide a resource response with status information also on channels not indicated in the resource request and/or on which the resource request is not received.

Figure 3A:
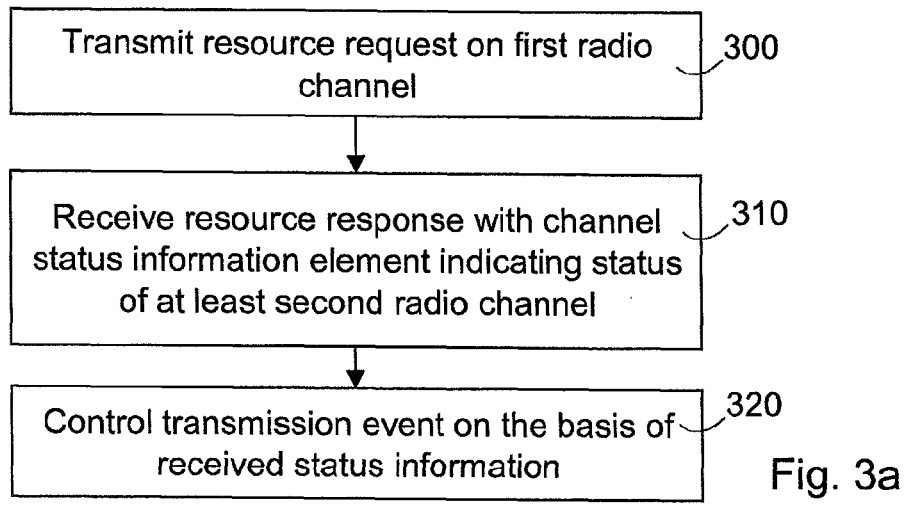
Figure 3B:
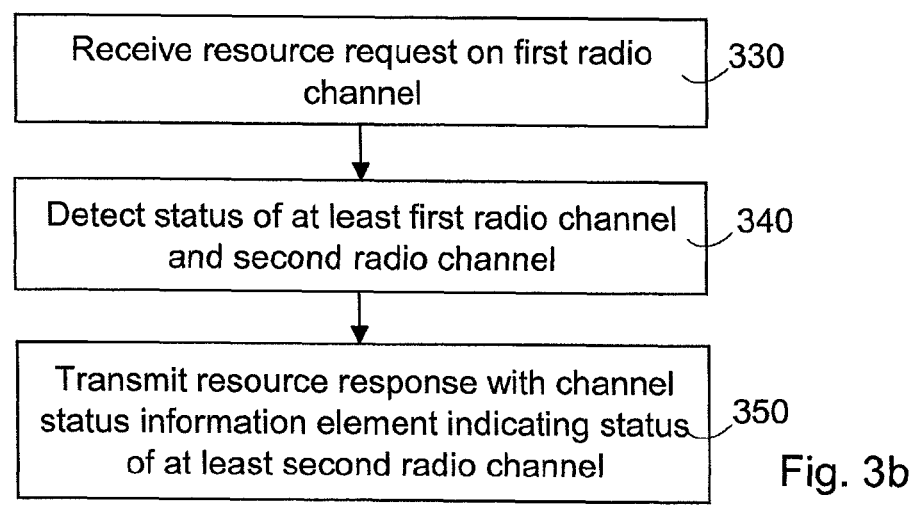

FIGS. 3a and 3b illustrate embodiments for providing channel status information, e.g. on the basis of a CCA measurement, to a resource requesting device from a responding device, e.g. by RTS/CTS signaling between a TXOP holder and an intended receiver of the TXOP transmitting the CTS. FIG. 3a illustrates a procedure for the resource requesting device, and FIG. 3b illustrates a procedure for the responding device.

At least one resource request is transmitted 300 to a responding device on a first radio channel. The resource request may be a request to reserve the first radio channel for data transfer between the requesting device and the responding device. In another embodiment, the resource request is a probing-stage to query whether or not the first radio channel is free before subsequent reservation of the channel(s) for data transfer. The probing-stage reservation message has short NAV duration to protect only the exchange of the following short control or management frames. The resource request may be an RTS message for reserving consecutive and/or non-consecutive radio channels for a time period. The RTS may comprise a duration field that sets the NAV on the channels on which the RTS is transmitted. The RTS may be transmitted as a result of channel sensing, e.g. through the CCA, on one or more channels detected to be free in the requesting device.

A resource response in response to the resource request is received 310 on the first radio channel from the responding device. The resource response comprises status information indicative of status of at least one further radio channel (denoted as the second radio channel) other than the first radio channel. In other words, the resource response comprises status information of at least one radio channel not requested to be reserved or queried by the requesting device. It is to be noted that the status information is to be understood broadly to refer to any information which may be used for detecting channel status. The status information may explicitly specify the idle or busy status of one or more radio channels. In another example embodiment, the status information indicates availability or non-availability of at least one radio channel and the status of the second radio channel is obtained on the basis of the status information and further radio channel-related information. However, the present status information related features may be applied in many other situations, even if there is no data to be transmitted. Further, the status data may be stored and applied at later point of time for directly or indirectly affecting communications event(s)

As illustrated in block 320, a transmission event, such as a 802.11ac TXOP, is controlled on the basis of the received status information. For example, the TXOP holder may use the status information to decide if it should request, for a multi-channel TXOP, reservation of a further channel detected to be idle on the basis of the received status information.

Referring now to FIG. 3b, at least one resource request on a first radio channel is received 330 from a requesting device. The resource request comprises a request to reserve the first radio channel for data transfer between the requesting device and the responding device, or the resource request is a probing-stage reservation message to query whether or not the first radio channel is free before the final reservation for data transfer.

In response to the resource request, status of at least the first channel and at least the second channel is detected. This information may be obtained on the basis of already obtained channel state information, or the responding device may perform channel state definition actions in block 340. For example, the responding device may perform a CCA procedure at least for all channels of the BSS and the channel status is determined on the basis of the results of the CCA procedure. The status information may be in a form of a CCA measurement result or report element. It is to be appreciated that the CCA measurement is performed in both the RTS and CTS transmitter at the same time, a point interframe space (PIFS) before RTS transmission. Thus, the CCA of the CTS transmitter may be based on history information and blocks 330 and 340 may also be in other order.

A resource response is transmitted 350 on the first radio channel to the requesting device, to respond to the resource request. The resource response comprises status information indicative of the status of at least the second radio channel not requested to be reserved or queried by the requesting device.

Thus, the present features enable further dynamic adaptability to channel reservation, and enable to further utilize radio channel status sensing results of the responding device in other devices. It is to be appreciated that in many cases the resource request is transmitted 310 on all channels the requesting device intends to use and detects to be idle. However, by applying the present features, it is possible to obtain status information on all applicable channels by just a single resource request and resource response message.

Figure 3C:
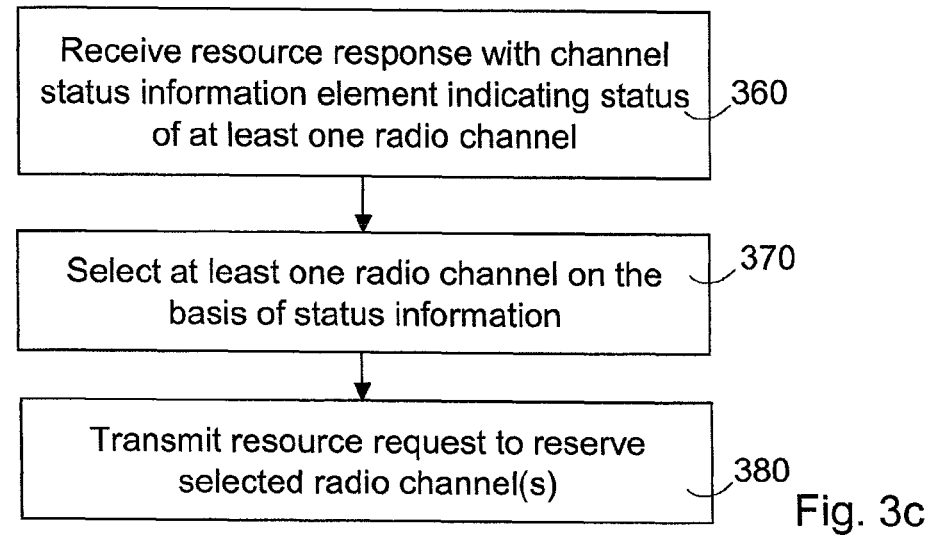

A further (third) device, such as a further 802.11ac device 10, 20 30 connected to the same BSS, may receive the resource response and use the status information for channel reservation. This is illustrated in FIG. 3c. A resource response with channel status information element indicating status of at least one non-requested or queried radio channel is received 360 on a first radio channel from a responding device. The resource response may be the resource response as indicated in connection with FIGS. 3a and 3b, e.g. a CTS message with non-requested channel information in response to an RTS from a TXOP holder.

At least one channel is selected 370 by the request response receiver on the basis of the status information. It will be appreciated that also further information, e.g. on initially requested channels, may be applied in block 370 by the resource response receiver.

A (second) resource request may then be transmitted 380 for reserving the at least one selected radio channel for data transfer between the o resource response receiver device and a further device such as the responding device or another device in the network. Thus, also further devices may benefit from the further channel status information transferred in resource responses, and it may be possible to reduce overall efforts required for determining idle channels.

The resource response receiver, i.e. the requesting device or another device, may use 320, 370 the status information on further channels in various ways. In some cases, e.g. when there is no further channels available or no need to use wider bandwidth, the requesting device may in block 320 decide to continue with the originally selected set of channels, on which the resource request may have been initially transmitted 300.

In an embodiment, a radio channel is selected in block 320, 370 for reservation based at least partly on the status information indicating at least one idle radio channel not requested to be reserved in the resource request. The requesting device may in/after block 320 transmit, on the basis of the status information in the resource response, a second resource request on a channel other than the first radio channel to the responding device or another device, to reserve at least two radio channels for simultaneous data transfer. For example, an IEEE 802.11ac STA may reserve further channels detected to be available on the basis of the status information by a further RTS/CTS signaling.

In another embodiment, on the basis of the received status information, direct link communications is established on channel(s) detected to be idle.

Figure 4:
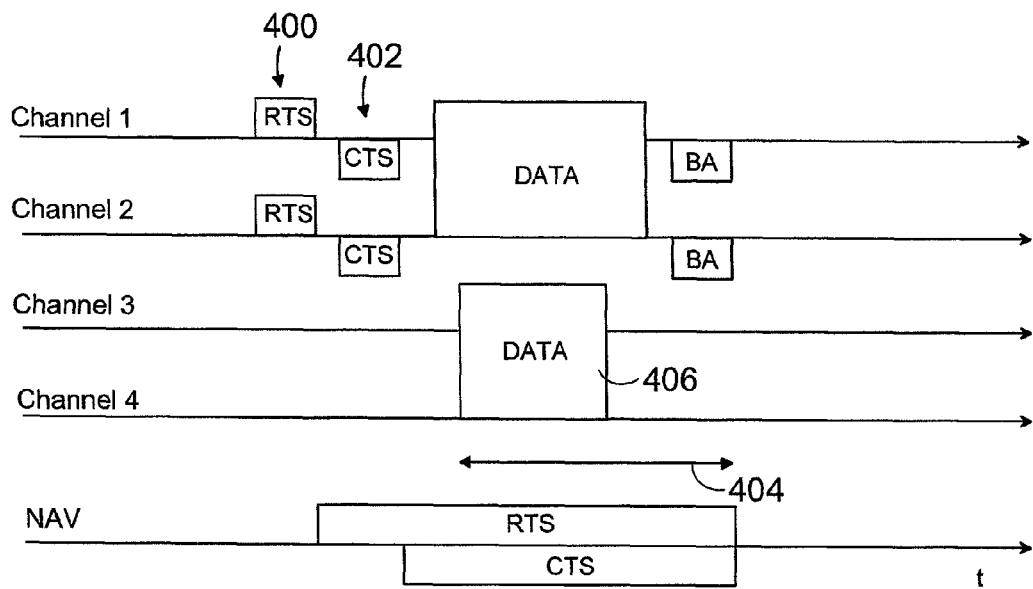
FIGS. 4 to 7 illustrate multi-channel transmission events applying status information according to some embodiments of the invention.

FIG. 4 provides an example operation applying 802.11ac based procedures. A resource requesting device, in this example an RTS transmitting device, requests 40 MHz bandwidth on channels 1 and 2 by RTS messages 400 on these channels.

Upon reception of the RTS message from the TXOP holder, the receiver may carry out a CCA procedure, or may have carried out the CCA procedure beforehand, and prepares the CTS message to be transmitted on those channel(s) detected to be free in the CCA procedure. The receiver may take into account detected NAVs of other STAs. In this case, the receiver device detects on the basis of results of CCA procedure that channels 1 and 2, and also channels 3 and 4 are idle. This responding device confirms the requested 40 MHz bandwidth by CTS messages 402 on channels 1 and 2.

The CTS messages 402 also comprise status information, e.g. in a form of an additional CCA indication element, directly or indirectly indicating that also channels 3 and 4 are idle. An opportunity window 404 is now available (after a PIFS or short interframe space (SIFS) from the CTS) for further transmissions. The RTS sender device, or another device receiving the CTS, detects the CCA indication and the availability of the tertiary and quaternary channels 3 and 4. For example, a tunneled direct link capable STA may use channels 3 and 4 to transmit data 406 simultaneously without contention with the RTS transmitting device and the CTS transmitting device communicating on channels 1 and 2. The devices may configure multiple receiver and transmitter address tuple to trigger their direct link into use. The transmission may continue until the NAV set by the CTS frame 402 expires (and block acknowledgements (BA) are transmitted at channels 1 and 2).

In an embodiment, the status information received in the resource response is used to update overall channel load situation. For example, an AP 20 may continuously monitor all operating channels and provide guidance on channel load situation, updated on the basis of the status information, to associated non-AP STAs and to other STAs in an overlapping basic services set (OBSS).

in a still further example embodiment, the status information received in the resource response is used to control TXOP limit in the device receiving the resource response. The TXOP limit defines the maximum duration during which the device is allowed to transmit. The TXOP duration may be adapted by the TXOP holder on the basis of information on currently available bandwidth indicated by the status information. For example, an 802.11ac STA may detect on the basis of the status information availability of further idle channels, decide to use also these idle channels, and (re-)compute the TXOP limit on the basis of the increased amount of available bandwidth to optimize maximum radio resource reservation time to this increased number of channels. Another example is that the AP 20 utilizes received status information when determining bandwidth-specific TXOP limit parameters. In one embodiment, the status information is applied to provide information on currently available bandwidth to define bandwidth-specific TXOP limits according to at least some of the embodiments described on pages 4 to 16 of U.S. patent application Ser. No. 13/006,823, incorporated herein as a reference. Thus, in some cases the requesting device (or the non-requesting response receiving device) may be the AP 20, and the status information may be indirectly applied for controlling aspects related to subsequent transmission events.

In another embodiment, the status information received in the resource response is used to facilitate dynamic channel selection. This may allow the BSS or OBSS to change their primary channels in response to the CCA measurements. Such capability may be used to harmonize the interworking between the BSS and OBSS, to minimize interference or maximize system capacity, for example.

In yet another embodiment, the status information received in the resource response is used by an AP, such as the AP 20, to enable a more precise resource reservation of non-AP STAs in the uplink during uplink-multiple users multiple input multiple output (UL-MU-MIMO) transmissions. In this respect, the status information may be conveyed in the CTS message or other response message, such as a very high throughput (VHT) compressed beamforming response transmitted in response to a sounding feedback sequence in the IEEE 802.11ac. The status information provides means to select the most suitable bandwidth for each STA, i.e. to use OFDMA-like (orthogonal frequency-division multiplexing access) dedicated resources for each transmitter or to select the optimal BW that is used by all transmitters, i.e. to use OFDM transmissions in UL MU-MIMO.

However, it will be appreciated that the examples above represent only some of available actions which may be carried out on the basis of the status information on non-requested or non-queried channels in the resource response.

In some embodiments, the resource request (300, 330) indicates whether the resource response is to include the status information. The responding device may be arranged to include (320) the status information in the resource response upon detecting such status information request indicator. Thus, the requesting device may specifically instruct the receiver of the resource request to include the status information. Such indicator may be included in an already existing or a new field of the resource request message, such as an RTS message. In some embodiments, the resource response message (310, 350, 360) may include a specific information element indicating that the resource response carries status information on further channels.

Let us now further study some more detailed examples for IEEE 802.11ac.

In a first embodiment, the CCA indication is included in bandwidth BW field of CTS frames. The CCA indication may be included automatically, or upon the resource request (300, 330) indicating that the resource response is to include the status information (on further channels).

In a further example embodiment, an additional bit is applied, to signal whether conventional bandwidth information or implicit CCA measurement report is transmitted in the CTS frame. This is illustrated in Table 1, in which the bolded portion indicates the example modification to include the status information in the form of a CCA indication.

TABLE 1

| INDICATED_CH_BANDWIDTH | INDICATED_DYN_BANDWIDTH | First 7 Bits of Scrambling Sequence | | |
|---|---|---|---|---|
| Not present | — | | Unused | |
| Present | Not present | 4 bit pseudo-Random nonzero integer | 0 All Reserved<br>1 CCA<br>Indication | BW:<br>00 (NON_HT_CBW20),<br>01 (NON_HT_CBW40), |
| Present | Present | 4 bit pseudo-random nonzero integer<br>B0    B3 | 0 (Static)<br>1 (Dynamic)<br>B4 | 10 (NON_HT_CBW80),<br>11 (NON_HT_CBW160)<br>B5    B6 |

The INDICATED_CH_BANDWIDTH parameter, if present, indicates the duplicated (reserved) bandwidth of the PLCP protocol data unit (PPDU). The INDICATED_DYN_BANDWIDTH, if present, indicates whether the RTS transmitter is capable of static or dynamic bandwidth operation. The INDICATED_CH_BANDWIDTH and/or INDICATED_DYN_BANDWIDTH parameters if present will be used to modify the first 7 bits (B6-B0) of the scrambling sequence which is used to initialize the state of a PLCP data scrambler used to scramble transmit data and descramble receive data in a 802.11ac device. In this example modification, the bit 4 (B4) of the CTS frame, without the INDICATED_DYN_BANDWIDTH parameter, indicates the status of the bandwidth reservation. Value '0' of the B4 indicates that all channels that are indicated as idle in BW field are reserved for the RTS transmitter, and value '1' of the B4 ('CCA Indication') indicates that all idle channels are not reserved for the RTS transmitter.

In another embodiment, the CCA indication is represented as 2 bits separately. An example of such CCA indication is illustrated in Table 2, in which the bolded portion indicates the example modification to include the status information in the form of a CCA indication. In this example case, the BW field is used to indicate reserved bandwidth, while the CCA indication field is used to indicate status information, both independently. In this way, the additional CCA information may be conveyed together with bandwidth information on requested channels in a single CTS message. The RTS message may remain unchanged.

TABLE 2

| INDICATED_CH_BANDWIDTH | INDICATED_DYN_BANDWIDTH | First 7 Bits of Scrambling Sequence | | | | |
|---|---|---|---|---|---|---|
| | | CTS Frame Content | | | | |
| Not present | — | Unused | | | | |
| Present | Not present | 3 bit pseudo-Random nonzero integer | CCA Indication: 00 (NON_HT_CBW20), 01 (NON_HT_CBW40), 10 (NON_HT_CBW80), 11 (NON_HT_CBW160) | | BW: 00 (NON_HT_CBW20), 01 (NON_HT_CBW40), 10 (NON_HT_CBW80), 11 (NON_HT_CBW160) | |
| | | B0 | B2 | B3   B4 | B5   B6 | |
| | | RTS Frame Content | | | | |
| Present | Present | 4 bit pseudo-Random nonzero integer | 0 (Static) 1 (Dynamic) | | BW: 00 (NON_HT_CBW20), 01 (NON_HT_CBW40), 10 (NON_HT_CBW80), 11 (NON_HT_CBW160) | |
| | | B0 | B3 | B4 | B5   B6 | |

It is possible that the CTS transmitter does not or cannot perform CCA measurement for all the channels. The channel to which CCA is not performed may be indicated busy in the CTS frame.

The 802.11ac uses the channels in specific order. Thus, the other STAs that receive indication that not all channels are in use know that the channel numbers higher than what has been indicated in the BW field will not be used for the transmission and they may take these channels into use. For instance, with reference again to FIG. 4, one BSS may have one transmission ongoing at the reserved channels and direct link transmission 406 at the higher channels that were indicated to be idle in the CTS messages 402.

Figure 2B:
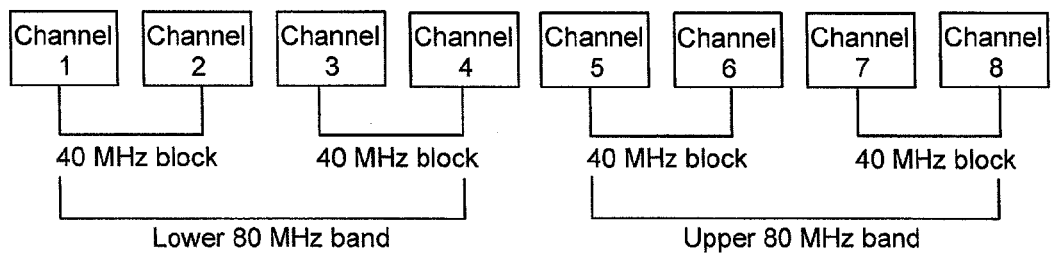

With reference also to FIG. 2b, in some embodiments, the status information comprises information on radio channels associated to at least one of the lower 80 MHz band and/or the upper 80 MHz band.

In an embodiment, the status information comprises a CCA measurement report for channels associated with the upper 80 MHz band. This is particularly useful in scenarios in which the RTS transmitter requests for wider bandwidth, since the RTS transmitter can figure out the channel state information in the granularity of 40 MHz block based on the reply of CTS frames only in the lower 80 MHz band. For example, the RTS transmitter requests for 80 MHz bandwidth and receive CTS frames on channels 1 and 2 which signify that only 40 MHz bandwidth is available from the CTS transmitter. By examination, the RTS transmitter will also know that the other 40 MHz block comprising of channels 3 and 4 is busy. However, this is not the case in the upper 80 MHz band, i.e. if the RTS transmitter requests 160 MHz bandwidth.

In an embodiment the status information is provided at the granularity of one or more radio channels, such as the channels illustrated in FIG. 2b. Thus the CCA measurement report may reflect only the busy or idle state at the granularity of a 40 MHz block. In other words, the RTS transmitter will not be able to tell which specific channel is busy given that a block of 40 MHz is not available. However, it knows that at least one of the channels in the 40 MHz block is busy. Of course, a granularity of 20 MHz block is also possible, but at the expense of using 8-bit representation which may be difficult to achieve in view of backward compatibility.

In a second example embodiment, additional bits are used in the CTS message to carry the channel status information. This enables to provide further detailed status information. In a further example embodiment, the number of bits used for the BW field is increased from 2 to 3 bits to incorporate more status information.

Table 3 provides an example of CTS frame contents with status information in the form of a CCA measurement regarding the upper 80 MHz band.

TABLE 3

| INDICATED_CH_BANDWIDTH | INDICATED_DYN_BANDWIDTH | First 7 Bits of Scrambling Sequence | | | |
|---|---|---|---|---|---|
| Not present | — | Unused | | | |
| Present | Not present | 4 bit pseudo-Random nonzero integer | 0 (BW) 1 (Implicit CCA) | BW: 00 (NON_HT_CBW20), 01 (NON_HT_CBW40), 10 (NON_HT_CBW80), 11 (NON_HT_CBW160) | |
| Present | Present | 4 bit pseudo-random nonzero integer | 0 (Static) 1 (Dynamic) | Implicit CCA: 00 (Channels 5, 6, 7, & 8 busy) 01 (Channels 5 & 6 busy) 10 (Channels 7 & 8 busy) 11 (Channels 5, 6, 7, & 8 free) | |
| | | B0 | B3   B4 | B5   B6 Transmit order | |

In this example, an additional bit, herein referred to as the BW/Implicit CCA indication (bolded in fourth column of Table 3), is used to signal whether the CTS frame is carrying BW field bandwidth information or implicit CCA measurement report for the upper 80 MHz band. The CTS frame can thus utilize 3 bits, similarly as in the case of the RTS frame, to carry the channel state information, and in particular for the larger transmission bandwidth.

When the BW/Implicit CCA indication bit is cleared to '0', it means that the CTS frame is feeding back only BW field bandwidth information as shown in the non-bolded portion of the last column of Table 3.

When the BW/Implicit CCA indication bit is set to '1', it means that the CTS frame is feeding back implicit CCA measurement report on channels associated with the upper 80 MHz band, regardless of the value in the bandwidth field of the RTS frame (the non-bolded portion of the last column of Table 2). The bolded portion of the last column of Table 3 illustrates an example of the values for indicating states of the upper 80 MHz band.

The advantage of this embodiment is that it is fully compatible with the earlier specification, and it can be implemented easily with only a simple modification. Furthermore, the CTS transmitter can signal to the RTS transmitter the availability of more bandwidth than what is requested by using implicit CCA measurement report.

Figure 5:
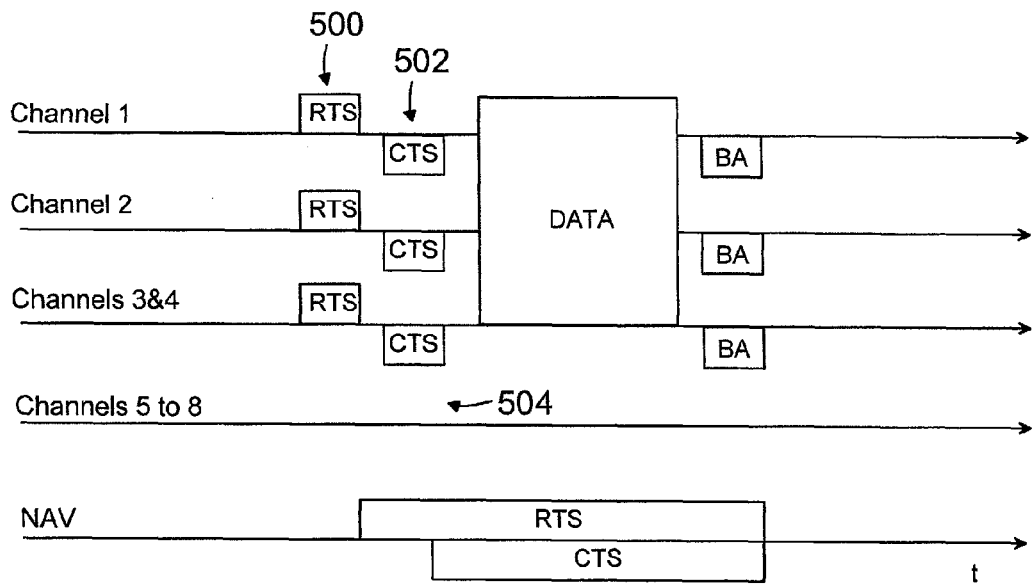

FIG. 5 provides an example, in which the RTS transmitter requests 500 80 MHz bandwidth on channels 1 to 4. The CTS transmitter confirms availability of the 80 MHz bandwidth by CTS 502 on these channels 1 to 4. The CTS transmitter may detect that also channels 5 to 8 are free, and indicates this by setting in the CTS the BW/Implicit CCA bit to '1' and the Implicit CCA field of Table 2 to '11'. Notice that no CTS is sent 504 on channels 5 to 8 as no RTS frames are received on these channels.

In another embodiment, instead of providing an option to signal BW field bandwidth information in the CTS frame, there is provided more detailed status information by a CCA measurement report across all channels, i.e., in both lower and upper 80 MHz bands. In this embodiment, the status information may reflect the busy or idle state of each individual channel.

Table 4 illustrates an example an example of CTS frame contents with status information in the form of a CCA measurement on lower and upper 80 MHz band.

An additional bit, referred to as the implicit CCA/explicit CCA indication, may be used to signal whether implicit or explicit CCA measurement results is transmitted in the CTS frame, as illustrated by the bolded portion of the fourth column of Table 4. The values for implicit and explicit CCA results are illustrated in the fifth column of the Table 4. This information may thus replace the BW field information.

The CTS transmitter has to perform CCA for at least the channels associated to the requested bandwidth in the case of explicit CCA measurement report. When the implicit CCA/explicit CCA indication bit is cleared to '0', it means that the CTS frame is feeding back explicit CCA measurement on channels associated to the requested bandwidth as specified by bandwidth field of the RTS frame.

When the implicit CCA/explicit CCA indication bit is set to '1', it means that the CTS frame is feeding back implicit CCA measurements on channels associated to both lower and upper 80 MHz bands, regardless of the value in the bandwidth field of the RTS frame.

Figure 6:
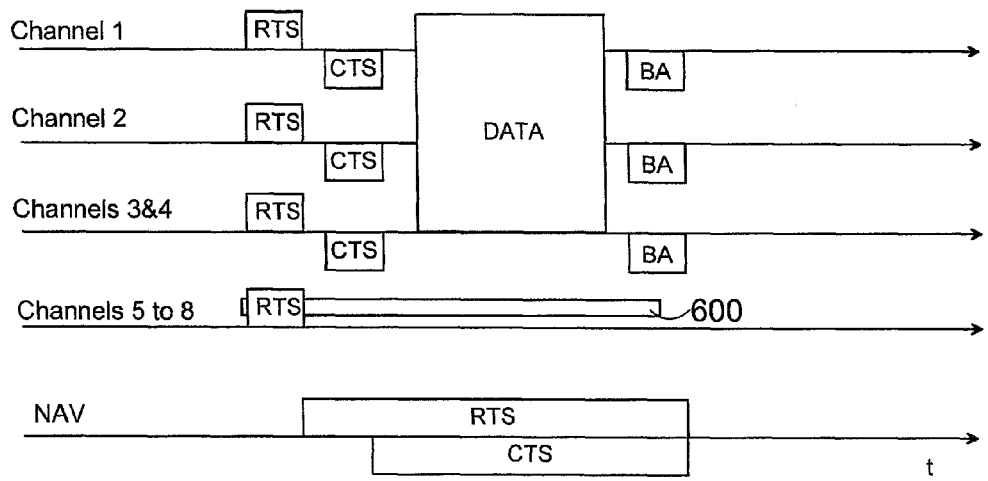

Thus, the RTS transmitter will know the exact state information of each channel associated with the requested bandwidth if and only if there is a single busy channel. With reference to example of FIG. 6, an RTS transmitter may request for 160 MHz bandwidth on channels 1 to 8. The CTS transmitter senses that channel 7 is busy 600 and thus confirms only the 80 MHz bandwidth by CTS transmission on channels 1 to 4. An explicit CCA measurement report may be included in the CTS frame to indicate that only channel 7 is busy. This may be done by clearing the implicit CCA/explicit CCA indication to '0' and setting the Explicit CCA field to '110'. Then, the RTS transmitter will know the exact channel availability of each individual channel.

The advantage of this embodiment is that the CTS transmitter may now provide the RTS transmitter with channel specific state information. This may be particularly useful for the RTS transmitter, such as the AP 20, to monitor and keep historical CCA measurements of each individual channel.

TABLE 4

| INDICATED_CH_BANDWIDTH | INDICATED_DYN_BANDWIDTH | First 7 Bits of Scrambling Sequence | | |
| --- | --- | --- | --- | --- |
| | | | Unused | |
| Not present | — | | | |
| Present | Not present | 3 bit pseudo-Random nonzero integer | 0 (Explicit CCA) 1 (Implicit CCA) | Explicit CCA: 000 (Channel 1 busy), 001 (Channel 2 busy), 010 (Channel 3 busy), 011 (Channel 4 busy), 100 (Channel 5 busy), 101 (Channel 6 busy), 110 (Channel 7 busy), 111 (Channel 8 busy) Implicit CCA: 000 (Channels 1, 2, 3, & 4 busy), 001 (Channels 1 & 2 busy), 010 (Channels 3 & 4 busy), 011 (Channels 1, 2, 3, & 4 free), 100 (Channels 5, 6, 7, & 8 busy), 101 (Channels 5 & 6 busy), 110 (Channels 7 & 8 busy), 111 (Channels 5, 6, 7, & 8 free) |
| | | B0    B2   B3 | B4 | B6 |

Such historical measurements could be used by the AP to configure, for example, the bandwidth specific TXOP limit parameters.

Regarding the embodiments providing further detailed status information, such as the embodiments illustrated above in connection with Tables 1 to 4, the CCA measurements can be implemented by taking reference from the CCA sensitivity levels for signals occupying or not occupying a 20 MHz channel as stated in Sections 22.3.20.5.1 and 22.3.20.5.2 of the 802.11ac Task Group document "Proposed TGac Draft Amendment", dated 18 Jan. 2011

In an embodiment, a TXOP consists of a probing phase in addition to reservation period for data transmission. The transmission of the resource request and the resource response may be communicated during the probing phase to inquire channel availability from the responding device before subsequent channel reservation for data transmission.

Duration of a first reservation period for the probe phase defined in a first resource request message may be confined to the probing phase. After receiving the resource response, a second reservation period may be calculated to extend to cover for data transmission. The duration of the second reservation period may be calculated, in the resource requesting device and/or the responding device, on the basis of a mismatch between the number of channels detected to be free with respect to the number of said plurality of channels in the resource request message. Thus, the duration of the second reservation period is longer in a case where at least one of said plurality of channels is detected not to be free than in a case where said plurality of channels are all detected to be free. The resource response message may comprise an information element defining the duration of the computed second reservation period. By applying at least some of the above indicated status information related features, it is not necessary to transmit a separate RTS for all channels intended to be reserved. Instead, it should suffice to send only a single RTS during the probing phase, and determine the available channels on the basis of status information in the subsequent single CTS. The separate RTS may cause increased contention or interference to the channels they are transmitted. When additional RTS are not transmitted, such unnecessary contention or corruption of the transmitted data is avoided.

The requesting device may then transmit a second resource request, such as an RTS, comprising an information element defining the duration of the second reservation period. After receiving a second resource response, such as a CTS, from the responding device in response to the second resource request, the requesting device may control transmission of data to the receiver during the second reservation period.

Computation of the reservation period on the basis of the channels that are detected to be free in both the transmitter and the receiver in response to the RTS/CTS handshake enables to optimize the duration of the reservation as compared to a case where the transmitter itself computes the reservation period on the basis of channels it detects to be free.

Minimum Bandwidth Indication

The RTS comprises an indication that sets the threshold of the amount of reserved resources that need to be available to send CTS back to RTS transmitter. The indication has two values, static and dynamic.

Figure 7:
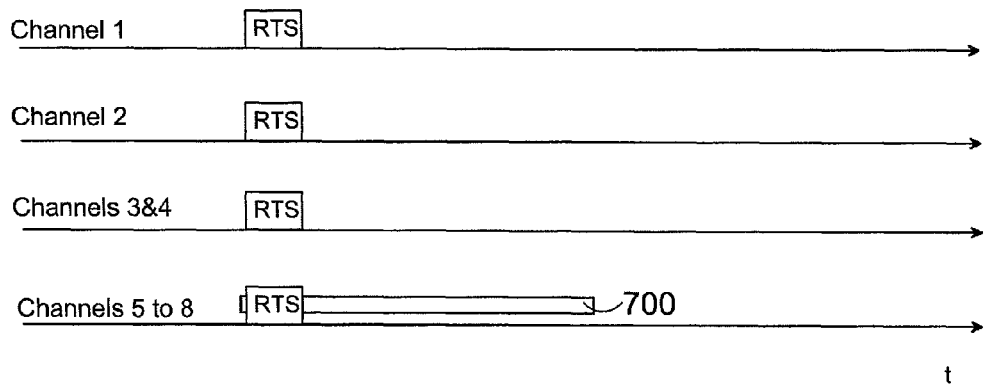

In the static operation mode, an RTS receiver sends a CTS only if all secondary channels indicated in the RTS are free. For example, with reference to FIG. 7, a transmitter which requested 160 MHz transmission bandwidth will not receive CTS (and thus no medium reservation from the receiver), if at least one of the requested channels is sensed busy. In the example of FIG. 7, the channel 7 is busy 700, and no CTS is returned. Thus, airtime of channels 1 to 6, and 8 is wasted.

According to some embodiments, there is provided a procedure to set further reservation conditions for resource responses, such as CTS transmissions. In an embodiment, a new RTS configuration element is applied for the RTS transmitter to signal the minimum bandwidth (BW) information to the CTS transmitter. If the CCA measurement of the CTS transmitter indicates that the amount of idle channels is less than minimum reservation criteria of the RTS frame, then no CTS frame is transmitted. The minimum BW information may be included in the RTS message, or preconfigured as a separate signaling. The knowledge of both maximum and minimum transmission bandwidth will enable a more precise control over the CTS transmitter with a set of pre-defined CTS response conditions.

Figure 8:
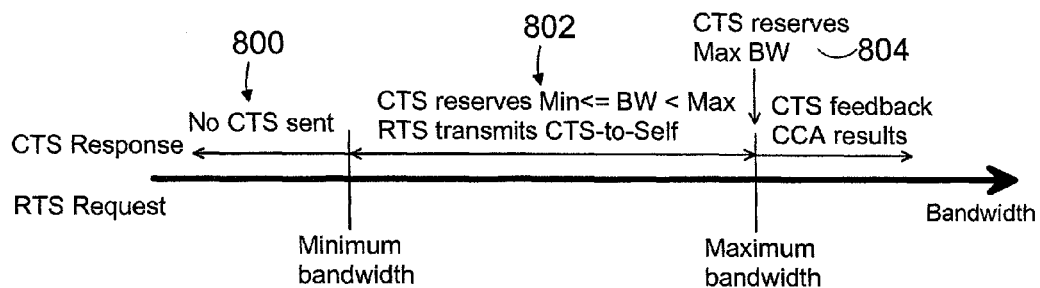
FIG. 8 illustrates application of CTS response conditions.

The preconfiguration of the minimum and maximum reservation levels is possible also with the dynamic reservation mode. In both reservation modes, the operation is similar, but the indication of the mode may be applied to communicate different levels of the minimum and maximum reservations FIG. 8 illustrates the reservation levels and CTS frame construction dependent on the amount of idle channels. The lower portion indicates an RTS request specifying the minimum BW and the maximum BW. The upper portion indicates resulting CTS. If the minimum BW is not achieved, no bandwidth is reserved and no CTS is sent 800. If there are idle channels such that the maximum BW is achieved, the maximum bandwidth is reserved and the CTS may provide CCA results 804. If the available bandwidth is between the minimum and maximum values, the available bandwidth is reserved 802. The RTS transmitter may then send a CTS-to-Self message, i.e. a CTS message is addressed to the TXOP holder itself to set the duration of the NAV protection to the same duration as indicated in CTS frame.

Figure 9:
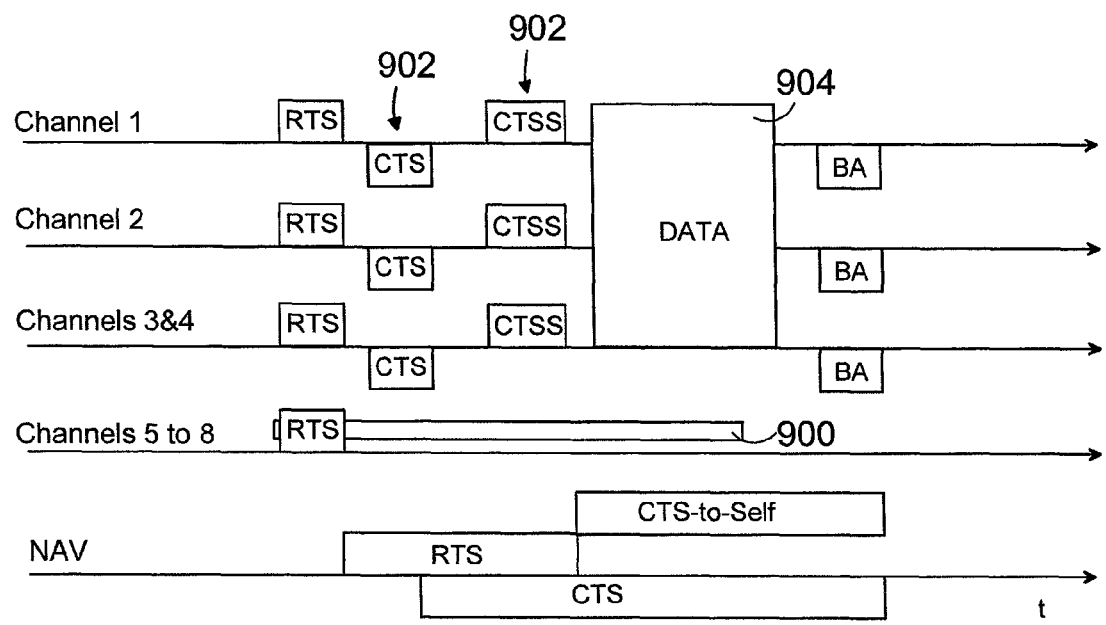
FIG. 9 illustrates a multi-channel transmission event applying minimum bandwidth indication according to an embodiment.

FIG. 9 provides an example illustrating an improved case for static reservation for 160 MHz transmission bandwidth, where the channel 7 is sensed busy 900. Since the RTS transmitter has specified its minimum transmission bandwidth requirement as 80 MHz, the CTS confirms 902 reservation of channels 1 to 4. The RTS transmitter sends a CTS-to-Self message 904 to extend its NAV protection and data may be transmitted 904 on the 80 MHz bandwidth. Thus, the airtime of at least channels 1 to 4 is not wasted on the transmitter side by unsuccessful medium reservation.

The present features enable to set more precise CTS response conditions. For example, the knowledge that minimum transmission bandwidth can be met allows the CTS transmitter to proceed/continue with medium reservation immediately without performing a second round of RTS/CTS signaling.

Figure 10:
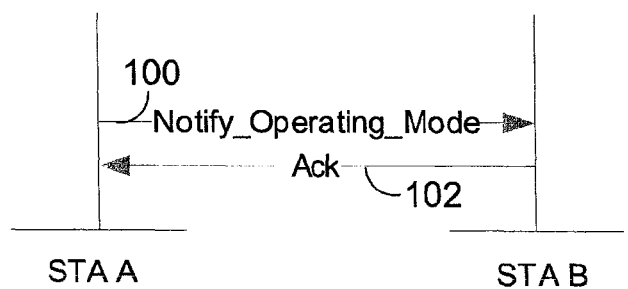
FIG. 10 illustrates an example of RTS configuration element signaling.

A device transmits a frame to individual address of the recipient to indicate that it would like to set a CTS response condition. As one example the transmitted frame may be Notify_Operating_Mode frame, illustrated in FIG. 10. The RTS configuration element may be included in a Notify_Operating_Mode message 100 from a STA A wishing to set reservation conditions for a STA B. The STA B sets the operating mode for the STA A as defined in the received message, e.g. sets the minimum BW for STA A, and sends an acknowledgement 102.

In an alternative embodiment, a request-response frame exchange is used. The request frame proposes new configurations for RTS handling and the response frame signals that the new configurations are in use. If no configuration message is transmitted, the default conditions may be used. For example, when no RTS configuration element is explicitly signaled, the CTS transmitter may operate the dynamic and static reservation modes without applying any minimum BW condition.

Some more detailed examples are provided below for setting the minimum condition. Table 5 provides an example of the RTS configuration element in case where only 20, 40, 80, and 160 MHz transmissions are possible.

TABLE 5

| Bits 0-1 | 2-3 | 4-5 | 6-7 |
|---|---|---|---|
| 20 MHz RTS | 40 MHz RTS | 80 MHz RTS | 160 MHz RTS |

The 20 MHz RTS field is two bits in length and configures the RTS frame that is transmitted to reserve 20 MHz channel width. The field may be set to '00' to indicate that the reservation is performed, if at least the primary channel is sensed to be available. The field values '01' to '11' may be reserved as the minimum bandwidth cannot exceed the requested bandwidth in the RTS frame.

The 40 MHz RTS field is two bits in length and configures the RTS frame that is transmitted to reserve 40 MHz channel width. The field may be set to '00' to indicate that the reservation is performed, if at least the primary channel is sensed to be available. The field may be set to '01' to indicate that the reservation is performed, if at least the primary channel and the secondary channel are sensed to be available. The field values '10' to '11' may be reserved as the minimum bandwidth cannot exceed the requested bandwidth in the RTS frame.

The 80 MHz RTS field is two bits in length and configures the RTS frame that is transmitted to reserve 80 MHz channel width. The field may be set to '00' to indicate that the reservation is performed, if at least the primary channel is sensed to be available. The field may be set to '01' to indicate that the reservation is performed, if at least the primary and the secondary channel are sensed to be available. The field may be set to '10' to indicate that the reservation is performed, if at least the primary, secondary, tertiary and quaternary channels are sensed to be available. The value '11' may be reserved as the minimum bandwidth cannot exceed the requested bandwidth in the RTS frame.

The 160 MHz RTS field is two bits in length and configures the RTS frame that is transmitted to reserve 160 MHz channel width. The field may be set to '00' to indicate that the reservation is performed, if at least the primary channel is sensed to be available. The field may be set to '01' to indicate that the reservation is performed, if at least the primary and the secondary channel are sensed to be available. The field may be set to '10' to indicate that the reservation is performed, if at least the primary, secondary, tertiary and quaternary channels are sensed to be available. The field may be set to '11' to indicate that the reservation is performed, if at least the primary, secondary, tertiary, quaternary, quinary (5), senary (6), septenary (7), and octonary (8) channels are sensed to be available.

Table 6 provides an example summary of mapping between the bit values and bandwidth. The same mapping is applied to signal the minimum and maximum bandwidths.

TABLE 6

| Bit Value | Minimum Bandwidth (MHz) | Maximum Bandwidth (MHz) |
|---|---|---|
| 00 | 20 | 20 |
| 01 | 40 | 40 |
| 10 | 80 | 80 |
| 11 | 160 | 160 |

The additional minimum bandwidth mapping may be used when populating the RTS configuration element of Table 5. The minimum bandwidth mapping can be exactly the same as the maximum bandwidth mapping to maintain the simplicity for better interworking.

Indication of Additional Bandwidth Configurations

As already indicated in connection with FIGS. 2b and 2c, the currently envisaged 802.11ac RTS/CTS signaling supports only a limited set of bandwidth configurations. However, it may be desirable to have further bandwidth configurations such as 40+40 MHz, 40+80 MHz, 80+40 MHz, 20+40 MHz, and 20+80 MHz to organize RTS/CTS signaling to communicate the minimum transmission bandwidth and different transmission bandwidth configurations. Additional bandwidth configuration options will enable better flexibility of bandwidth usage. Below are some available options of bandwidth configurations to support full flexibility of bandwidth usage.

One embodiment for the minimum bandwidth indication assumes that the handling of the quinary (5), senary (6), septenary (7), and octonary (8) channels, or the secondary band will change in the 802.11ac. The transmissions in non-continuous band may use the same transmission bandwidths as the primary band. For example the transmission bandwidth of the secondary band includes transmission in the following channels:

- the quinary(5) channel, i.e., a 20 MHz bandwidth in the secondary band; or
- the quinary (5) and senary (6) channels, i.e., a 40 MHz bandwidth in the secondary band; or
- the quinary (5), senary (6), septenary (7), and octonary (8) channels, i.e., a 80 MHz bandwidth in the secondary band.

The capability of the RTS and CTS transmitters to signal bandwidth configuration information between each other after CCA sensing may be applied together with the RTS configuration element which specifies the minimum transmission bandwidth.

Figure 11:
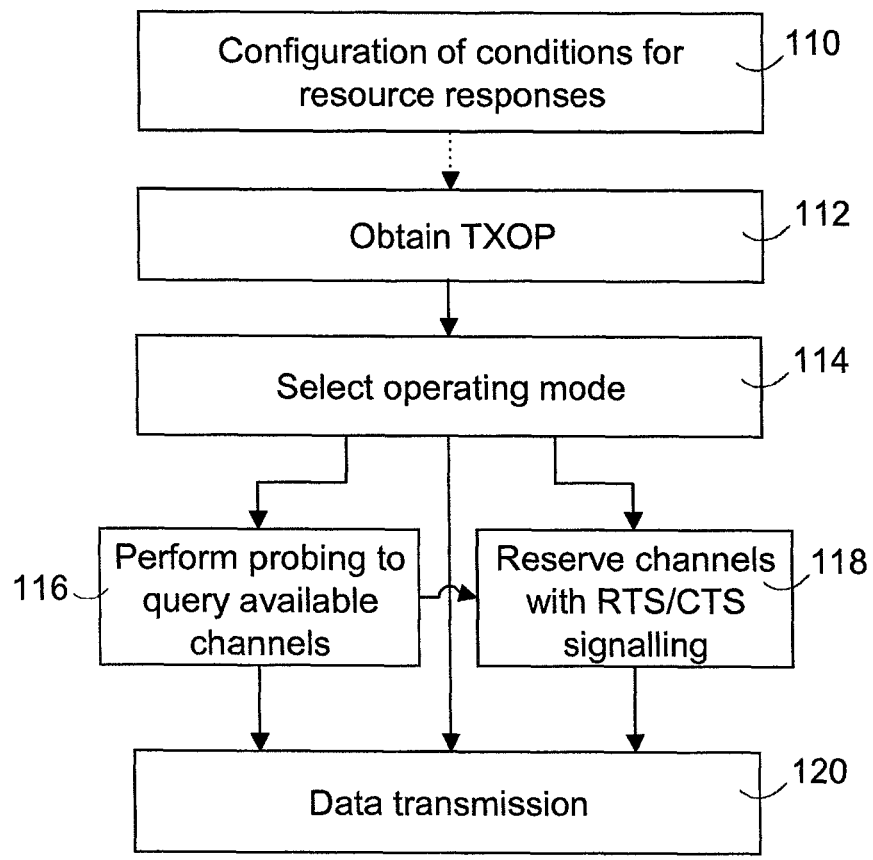
FIGS. 11 and 12 illustrate methods according to some embodiments of the invention.

FIG. 11 illustrates a high-level overview of the dynamic bandwidth configuration and reservation procedure. In block 110 conditions for resource responses are configured. At least some of the above illustrated CTS response condition setting related features may be applied, for example. When the device applying the method of FIG. 11 obtains a TXOP 112, implementation specific logic may select 114 between options 116, 118, and 120. In block 116 a probing procedure is performed before the final channel reservation 118 for data transfer. In some cases, direct data transmission is possible without blocks 116, 118 and NAV setting.

Figure 12:
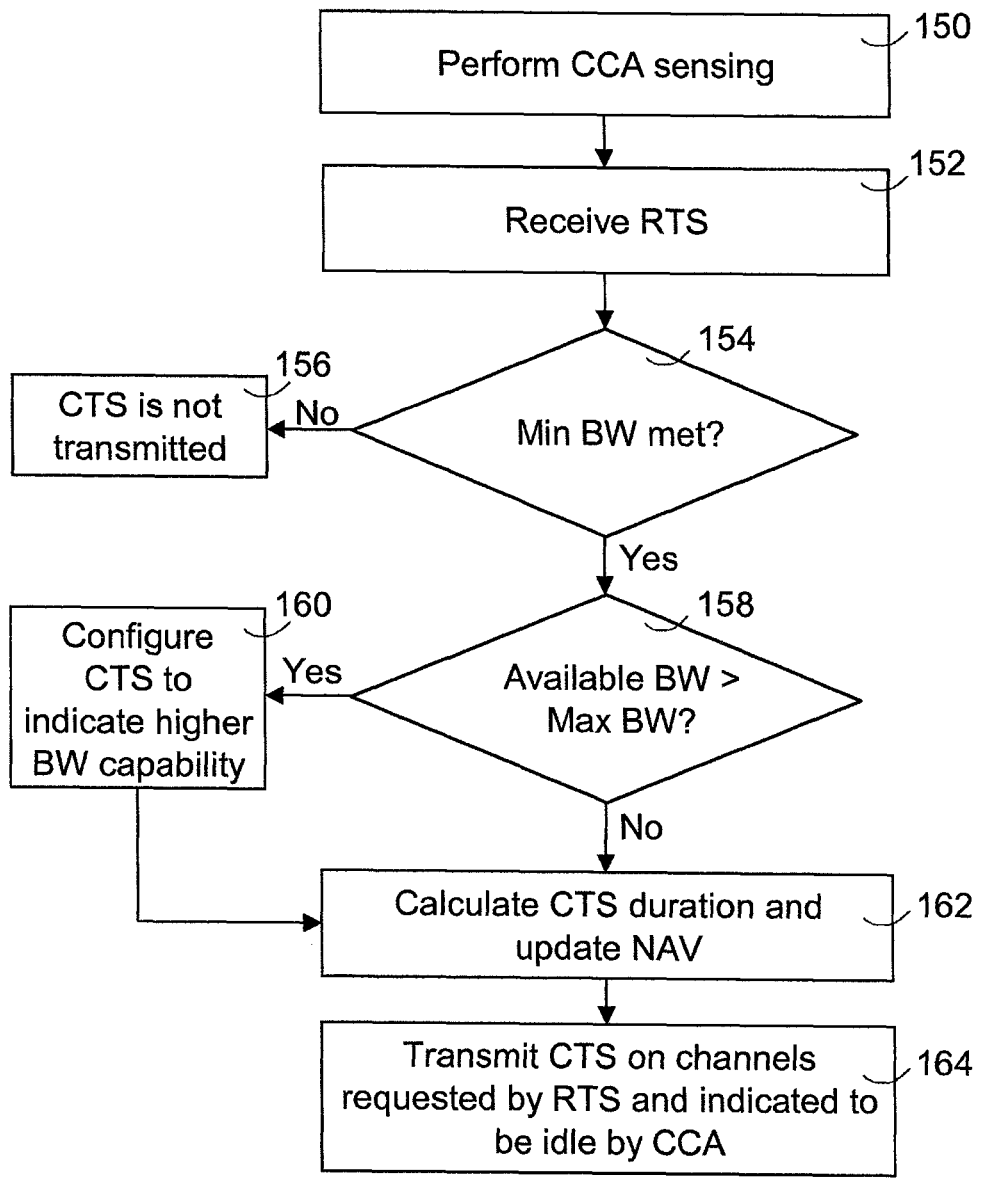

FIG. 12 illustrates operations for a CTS transmitter during dynamic bandwidth reservation mode. In block 150 CCA sensing is performed for PIFS duration to determine currently available BW. In block 152 an RTS, the receiver address of which equals to the address of the device implementing the method of FIG. 12, is received from a TXOP holder. It is to be noted that the CCA sensing may be aligned with the TXOP holder.

The procedure checks 154 if a minimum BW condition is met. The minimum BW may have been set by applying at least some of the above illustrated CTS response condition setting related features. If the minimum BW is not met, no CTS is transmitted 156. If the minimum BW is met, the CTS may in response to the RTS inform the TXOP holder that the minimum BW is met. The procedure then checks 158 whether the available BW exceeds the maximum BW. If yes, the CTS may be configured to include 160 channel status information according to some embodiments to indicate higher BW capability. In block 162 CTS duration may be calculated and NAV updated. The CTS is transmitted 164 on channels requested by the RTS and indicated to be idled on the basis of the CCA.

In an embodiment, the (3 bits) in the RTS and CTS frame are used to indicate the bandwidth configuration to be reserved. Note that this implies that the ability to specify the static or dynamic reservation mode in the RTS frame will be traded off with up to 8 possible bandwidth configurations. In some cases, these combinations may be configured on the fly based on some sensing algorithms that need not to be further discussed herein.

However, it is always possible to use only 2 bits in the RTS frame to signal up to 4 possible bandwidth configurations while keeping the ability to indicate the static or dynamic reservation mode. When applying only 3 bits, some other possible combinations of bandwidth configurations are not used. Table 7 provides an example of bandwidth configurations indicated by 3 bits.

TABLE 7

| Value | Primary Band (MHz) | Secondary Band (MHz) |
|---|---|---|
| 000 | 20 | 0 |
| 001 | 40 | 0 |
| 010 | 80 | 0 |
| 011 | 40 | 40 |
| 100 | 80 | 40 |
| 101 | 20 | 80 |
| 110 | 40 | 80 |
| 111 | 80 | 80 |

The reserved bandwidth configuration may have the same or smaller bandwidth than what is proposed by the RTS frame. For example, if the 80+80 MHz is proposed to be reserved by the RTS frame, any combination may be reserved. However, when 40+40 MHz is proposed to be reserved, 20, 40 or 40+40 MHz channels may be reserved.

Some further examples of use cases and bandwidth configurations are provided below. For example, a device may know that the OBSS has its primary channel in the quaternary channel. The device is not fully aware of all the OBSSs in the secondary BW area and it is desirable to have some flexibility for its usage. Further the device is not interested to use RTS/CTS for its primary and secondary channels, because it assumes that there are not many hidden terminal problems in these channels. It is then desirable to have flexibility for the device for proposing reservation sizes for primary and secondary bandwidths.

Table 8 provides an example of a full set of bandwidth configurations for RTS and CTS frames.

TABLE 8

| RTS Value | Proposed BW in RTS to be reserved | CTS Value 000 | CTS Value 001 | CTS Value 010 | CTS Value 011 | CTS Value 100 | CTS Value 101 | CTS Value 110 | CTS Value 111 |
|---|---|---|---|---|---|---|---|---|---|
| 000 | 20 + 0 | 20 + 0 | NA | NA | NA | NA | NA | NA | NA |
| 001 | 40 + 0 | 20 + 0 | 40 + 0 | NA | NA | NA | NA | NA | NA |
| 010 | 80 + 0 | 20 + 0 | 40 + 0 | 80 + 0 | NA | NA | NA | NA | NA |
| 011 | 40 + 40 | 20 + 0 | 40 + 0 | NA | 40 + 40 | NA | NA | NA | NA |
| 100 | 80 + 40 | 20 + 0 | 40 + 0 | 80 + 0 | 40 + 40 | 80 + 40 | NA | NA | NA |
| 101 | 20 + 80 | 20 + 0 | NA | NA | NA | NA | 20 + 80 | NA | NA |
| 110 | 40 + 80 | 20 + 0 | 40 + 0 | NA | 40 + 40 | NA | 20 + 80 | 40 + 80 | NA |
| 111 | 80 + 80 | 20 + 0 | 40 + 0 | 80 + 0 | 40 + 40 | 80 + 40 | 20 + 80 | 40 + 80 | 80 + 80 |

In order to have more granularity of the minimum transmission bandwidth requirement to interwork with the bandwidth configurations of the second embodiment, the minimum bandwidth mapping in Table 6 can be extended to represent all the possible sum of primary+secondary bandwidth by an additional bit as shown in Table 9 below.

TABLE 9

| Value | Minimum Bandwidth (MHz) | Maximum Bandwidth (MHz) |
|---|---|---|
| 000 | 20 | 20 |
| 001 | 40 | 40 |
| 010 | 60 | 80 |
| 011 | 80 | 160 |
| 100 | 100 | NA |
| 101 | 120 | NA |
| 110 | 160 | NA |
| 111 | Reserved | NA |

Thus, various alternatives are available for signaling bandwidths by using 2 or 3 bits in RTS and CTS frames. However, the same principle may be generalized to use 4 bits to signal the bandwidth. Table 10 provides an example of bit mappings for 4 bit bandwidth indication.

TABLE 10

| Value | Primary Band (MHz) | Secondary Band (MHz) |
|---|---|---|
| 0000 | 20 | 0 |
| 0001 | 40 | 0 |
| 0010 | 80 | 0 |
| 0011 | 20 | 20 |
| 0100 | 40 | 20 |
| 0101 | 80 | 20 |
| 0110 | 20 | 40 |
| 0111 | 40 | 40 |
| 1000 | 80 | 40 |
| 1001 | 20 | 80 |
| 1010 | 40 | 80 |
| 1011 | 80 | 80 |
| 1100-1111 | Reserved | Reserved |

Figure 13:
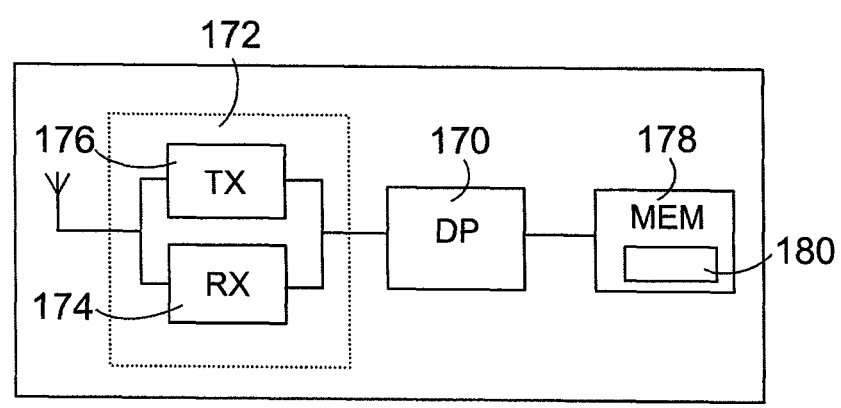
FIG. 13 illustrates a block diagram of an apparatus according to an embodiment of the invention.

FIG. 13 is a simplified block diagram of high-level elements of an apparatus according to an embodiment. The apparatus comprises a data processing element DP 170 with at least one data processor and a memory 178 storing a program 180. The apparatus may comprise at least one radio frequency transceiver 172 with a transmitter 176 and a receiver 174.

The memory 178 may comprise a volatile portion and non-volatile portion and implemented using any suitable data storage technology suitable for the technical implementation context of the respective entity. The memory 178 may also store communication parameters and other information needed for the wireless communications. The data processing element 170 may be of any type suitable to the local technical environment, and may include one or more of general purpose computers, special purpose computers (such as an application-specific integrated circuit (ASIC) or a field programmable gate array FPGA), microprocessors, digital signal processors (DSPs) and processors based on a multi-core processor architecture, as non-limiting examples.

In general, various embodiments of the presently disclosed features may be implemented by computer software stored on a computer-readable medium, such as the memory 178 and executable by the data processing element 170 of the apparatus, or by hardware (such as an ASIC), or by a combination of software and/or firmware and hardware in the apparatus.

In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 13. A computer-readable medium may comprise a computer-readable storage medium that may be any media or means that can contain or store the instructions for use by or in connection with an instruction execution system, apparatus, or device, such as a computer.

The program 180 may comprise computer program instructions that, when executed by a data processor 170, enable the apparatus to operate in accordance with at least some embodiments of the present invention. The program may comprise computer program code configured to, with the at least one processor, cause the apparatus to perform at least some of the features illustrated in connection with FIGS. 3a to 12.

The apparatus could be in a form of a chip unit, a processor, a microcontroller, or some other kind of circuitry or combination of such circuitries for controlling a radio device. The hardware module may form part of the device and could be removable. An example of such hardware module is a sub-assembly.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The apparatus of FIG. 13 may be arranged to use licensed and/or unlicensed bands. The apparatus may be arranged to support multiple input multiple output MIMO or multi-user MIMO and comprise a plurality of antennas and transceivers. The apparatus may be embodied as a mobile communications device. For instance, a wireless communications device, such as the device 10, 30 of FIG. 1 may comprise the elements of FIG. 13. The apparatus may be configured to operate as an IEEE 802.11ac STA, AP, or mesh point. The apparatus is configured to arrange an enhanced distributed channel access function EDCAF for each access category AC contending for TXOPs applying at least some of the above illustrated features. It should be appreciated that the above-illustrated embodiments provide only examples of some radio technologies in which the features related to applying adaptive transmission opportunity properties may be applied. However, in some other embodiments, the apparatus may operate according to a different communication protocol to the IEEE WLAN 802.11 protocols. It will be appreciated that the apparatus may comprise various further elements, such as further processor(s), further communication unit(s), user interface components, a battery, a media capturing element, and a user identity module, not discussed in detail herein.

Although the apparatus and the data processing element 170 are depicted as a single entity, different features may be implemented in one or more physical or logical entities. There may be further specific functional module(s), for instance for carrying one or more of the features described in connection with FIGS. 3a-3c, 11, or 12.

The present invention is applicable to wireless telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   transmitting, by a requesting device, at least one resource request to a responding device, the resource request being transmitted on a first radio channel; and
   detecting, by the requesting device, a resource response on the first radio channel from the responding device after the resource request;
   wherein the resource request comprises a request to reserve the first radio channel between the requesting device and the responding device; and
   the resource response comprises status information indicative of status of at least one second radio channel not requested to be reserved by the requesting device.

2. The method of claim 1, wherein the status information comprises at least one of an idle state and a busy state.

3. The method of claim 1, wherein the resource request is a request to send message, and the resource response is a clear to send message.

4. The method of claim 1, wherein the status information comprises information on clear channel assessment measurement results for the at least one second radio channel, based on a measurement performed by the responding device.

5. The method of claim 1, further comprising:
selecting, by the requesting device, at least one radio channel other than the first radio channel for reservation at least partly on the basis of the status information on the at least one second radio channel not requested to be reserved by the resource request, and
transmitting a second resource request on the selected at least one channel and at least one other channel to reserve at least two radio channels for simultaneous data transfer between the requesting device and the responding device.

6. The method of claim 1, wherein at least two radio channels are reserved for multi-channel operation by a transmission opportunity holder in a wireless local area network.

7. A method comprising:
receiving, by a responding device, at least one resource request from a requesting device, the resource request being received on a first radio channel; and
transmitting, in response to the resource request by the responding device, a resource response on the first radio channel;
wherein the resource request comprises a request to reserve the first radio channel between the requesting device and the responding device; and
the resource response comprises status information indicative of status of at least one second radio channel not requested to be reserved by the requesting device;
wherein the status information comprises information on clear channel assessment measurement results for the at least one second radio channel, based on a measurement performed by the responding device.

8. The method of claim 7, wherein the status information comprises at least one of an idle state and a busy state.

9. The method of claim 7, wherein the resource request is a request to send message, and the resource response is a clear to send message.

10. The method of claim 7, wherein at least two radio channels are reserved for multi-channel operation for a transmission opportunity holder in a wireless local area network.

11. An apparatus comprising:
at least one processor; and
at least one memory including a computer program code, wherein the at least one memory and the computer program code are configured, with the at least one processor, to cause the apparatus to
cause transmission of at least one resource request to a responding device, the resource request being transmitted on a first radio channel; and
detect a resource response on the first radio channel from the responding device after the resource request;
wherein the resource request comprises a request to reserve the first radio channel; and
the resource response comprises status information indicative of status of at least one second radio channel not requested to be reserved by the apparatus.

12. The apparatus of claim 11, wherein the status information comprises at least one of idle state and busy state.

13. The apparatus of claim 11, wherein the resource request is a request to send message, and the resource response is a clear to send message.

14. The apparatus of claim 11, wherein the status information comprises information on clear channel assessment measurement results for the at least one second radio channel, based on a measurement performed by the responding device.

15. The apparatus of claim 11, wherein the apparatus is configured to select at least one radio channel other than the first radio channel for reservation at least partly on the basis of the status information on the at least one second radio channel not requested to be reserved by the resource request, and
cause transmission of a second resource request on the selected at least one channel and at least one other channel to reserve at least two radio channels for simultaneous data transfer between the requesting device and the responding device.

16. The apparatus of claim 11, wherein the apparatus is a wireless communications device configured to detect a transmission opportunity in a wireless local area network and reserve at least two radio channels for multi-channel operation.

17. An apparatus, comprising
at least one processor; and
at least one memory including a computer program code, wherein the at least one memory and the computer program code are configured, with the at least one processor, to cause the apparatus to:
detect at least one resource request received from a requesting device on a first radio channel; and
cause transmission of a resource response on the first radio channel in response to the resource request;
wherein the resource request comprises a request to reserve the first radio channel for the requesting device; and
the resource response comprises status information indicative of status of at least one second radio channel not requested to be reserved by the requesting device.

18. The apparatus of claim 17, wherein the status information comprises at least one of idle state and busy state.

19. The apparatus of claim 17, wherein the resource request is a request to send message, and the resource response is a clear to send message.

20. The apparatus of claim 17, wherein the status information comprises information on clear channel assessment measurement results for the at least one second radio channel, based on a measurement performed by the apparatus.

21. The apparatus of claim 17, wherein the apparatus is a wireless communications device configured to reserve at least two radio channels for multi-channel operation for a transmission opportunity holder in a wireless local area network.

22. An apparatus, comprising at least one processor; and
at least one memory including a computer program code, wherein the at least one memory and the computer program code are configured, with the at least one processor, to cause the apparatus to:
detect a resource response received on a first radio channel from a responding device;
wherein the resource response is a response to a first resource request for reserving the first radio channel between a requesting device and a responding device, and the resource response comprises status information indicative of status of a second radio channel not requested to be reserved; and
cause transmission of a second resource request for reserving at least one radio channel for data transfer between the communications device and a fourth device, wherein the at least one channel being reserved by the second resource request is selected based on the received resource response.

23. The apparatus of claim 22, wherein the apparatus is the requesting device or another requesting device.

24. A computer program product comprising a non-transitory computer-readable medium bearing computer program code embodied therein for use with an apparatus, the computer program code causing the apparatus to
- cause transmission of at least one resource request to a responding device, the resource request being transmitted on a first radio channel; and
- detect a resource response on the first radio channel from the responding device after the resource request;
- wherein the resource request comprises a request to reserve the first radio channel; and
- the resource response comprises status information indicative of status of at least one second radio channel not requested to be reserved by the apparatus.

\* \* \* \* \*